(12) United States Patent
Iurii et al.

(10) Patent No.: US 11,371,527 B2
(45) Date of Patent: Jun. 28, 2022

(54) COMPRESSOR ROTOR DISK FOR GAS TURBINE

(71) Applicant: DOOSAN HEAVY INDUSTRIES & CONSTRUCTION CO., LTD., Changwon-si (KR)

(72) Inventors: Goroshchak Iurii, Gimhae-si (KR); Ievdoshyn Andrii, Gimhae-si (KR)

(*) Notice: Subject to any disclaimer, the term of this patent is extended or adjusted under 35 U.S.C. 154(b) by 102 days.

(21) Appl. No.: 16/034,349

(22) Filed: Jul. 13, 2018

(65) Prior Publication Data
US 2019/0078584 A1    Mar. 14, 2019

(30) Foreign Application Priority Data

Sep. 14, 2017    (KR) .................. 10-2017-0118037

(51) Int. Cl.
| | | |
|---|---|---|
| F04D 29/32 | (2006.01) |
| F01D 5/30 | (2006.01) |
| F04D 29/52 | (2006.01) |
| F04D 19/02 | (2006.01) |
| F01D 5/06 | (2006.01) |

(52) U.S. Cl.
CPC .......... *F04D 29/322* (2013.01); *F01D 5/066* (2013.01); *F01D 5/3007* (2013.01); *F04D 19/02* (2013.01); *F04D 29/522* (2013.01); *F05D 2220/3216* (2013.01); *F05D 2260/941* (2013.01)

(58) Field of Classification Search
CPC .... F04D 29/322; F04D 29/329; F04D 29/522; F04D 19/02; F01D 5/10
See application file for complete search history.

(56) References Cited

U.S. PATENT DOCUMENTS

| | | | | |
|---|---|---|---|---|
| 2,942,842 A | * | 6/1960 | Hayes ...................... | F01D 5/30 416/221 |
| 3,047,268 A | * | 7/1962 | Leavitt .................. | F01D 5/3015 416/220 R |

(Continued)

FOREIGN PATENT DOCUMENTS

| | | |
|---|---|---|
| JP | 2005-226649 A | 8/2005 |
| JP | 4776262 B2 | 9/2011 |

(Continued)

OTHER PUBLICATIONS

A Korean Office Action dated Aug. 1, 2018 in connection with Korean Patent Application No. 10-2017-0118037 which corresponds to the above-referenced U.S. application.

(Continued)

*Primary Examiner* — Topaz L. Elliott
*Assistant Examiner* — Aye S Htay
(74) *Attorney, Agent, or Firm* — Harvest IP Law, LLP (57) ABSTRACT

A compressor rotor disk for a gas turbine includes a circumferential surface; and a plurality of dovetail slots formed along the circumferential surface, each dovetail slot comprising a cutout portion formed by removing a portion of a radially outer convex surface of the dovetail slot. The compressor rotor disk can reduce stresses generated in the compressor rotor disk by centrifugal force, by reducing the centrifugal force of the compressor rotor disk through the formation of the cutout portion at the radially outer portion of the compressor rotor disk, thereby enhancing the durability and reliability of the compressor rotor disk.

10 Claims, 6 Drawing Sheets

(56) References Cited

U.S. PATENT DOCUMENTS

| | | | | |
|---|---|---|---|---|
| 3,294,364 | A * | 12/1966 | Stanley | F01D 11/008 416/219 R |
| 3,610,772 | A * | 10/1971 | Wagle | F01D 5/066 416/8 |
| 3,891,351 | A * | 6/1975 | Norbut | F01D 5/3007 416/219 R |
| 4,247,256 | A | 1/1981 | Maghon | |
| 4,527,952 | A * | 7/1985 | Forestier | F01D 5/323 416/220 R |
| 4,621,979 | A * | 11/1986 | Zipps | F01D 5/3007 416/219 R |
| 5,277,548 | A | 1/1994 | Klein | |
| 5,580,217 | A * | 12/1996 | Richards | F01D 11/006 416/193 A |
| 5,713,721 | A * | 2/1998 | Glynn | F01D 5/323 416/220 R |
| 6,183,202 | B1 | 2/2001 | Ganshaw | |
| 6,439,851 | B1 * | 8/2002 | Wong | F01D 5/147 416/219 R |
| 6,457,942 | B1 * | 10/2002 | Forrester | F01D 11/008 416/220 R |
| 6,565,322 | B1 | 5/2003 | Lieser et al. | |
| 7,104,759 | B2 * | 9/2006 | Tipton | F01D 5/3007 416/204 A |
| 8,251,668 | B2 * | 8/2012 | Kasperski | F01D 5/3007 29/888.02 |
| 9,249,669 | B2 | 2/2016 | Garcia-Crespo et al. | |
| 2005/0175462 | A1 | 8/2005 | Lagrange et al. | |
| 2005/0220624 | A1 | 10/2005 | Tipton | |
| 2008/0273982 | A1 * | 11/2008 | Chunduru | F01D 5/326 416/220 R |
| 2016/0138407 | A1 * | 5/2016 | Freeman | F01D 5/02 416/214 A |
| 2016/0186591 | A1 * | 6/2016 | Healy | F01D 11/008 415/199.5 |

FOREIGN PATENT DOCUMENTS

| | | |
|---|---|---|
| JP | 5583493 B2 | 9/2014 |
| JP | 2016-509646 A | 3/2016 |
| JP | 2016-211542 A | 12/2016 |
| KR | 10-2002-0005034 A | 1/2002 |
| KR | 10-1624054 B1 | 5/2016 |

OTHER PUBLICATIONS

An European Search Report dated Jan. 11, 2019 in connection with European Patent Application No. 18187188.0 which corresponds to the above-referenced U.S. application.

* cited by examiner

Related Art

A-A Section

[FIG. 6]

COMPRESSOR ROTOR DISK FOR GAS TURBINE

CROSS-REFERENCE TO RELATED APPLICATION

This application claims priority to Korean Patent Application No. 10-2017-0118037, filed on Sep. 14, 2017, the disclosure of which is incorporated herein by reference in its entirety.

BACKGROUND OF THE INVENTION

Field of the Invention

Exemplary embodiments of the present disclosure relate to a compressor rotor disk included in a compressor of a gas turbine, and more particularly, to a compressor rotor disk having a new structure that can reduce a level of stress by a centrifugal load of the rotating compressor rotor disk.

Description of the Related Art

A gas turbine is a power engine that mixes air compressed in a compressor with fuel for combustion, and rotates a turbine by hot gas generated by the combustion. The gas turbine is used to drive a generator, an aircraft, a ship, a train, etc.

This gas turbine generally includes a compressor, a combustor, and a turbine. The compressor sucks and compresses outside air, and then transmits it to the combustor. The air compressed in the compressor is in a high-pressure and high-temperature state. The combustor mixes the compressed air introduced from the compressor with fuel and burns the mixture. Combustion gas generated by the combustion is discharged to the turbine. The turbine is rotated by the combustion gas to thereby generate power. The generated power is used in a variety of fields, such as generating electric power and driving machines.

The gas turbine is a rotary power engine and may have a single shaft interconnecting the compressor and turbine. In the gas turbine, for example a gas turbine for power generation, in which the blades of the compressor and turbine rotate at very high speed, namely, 3,600 RPM under a rated operating condition (at an alternating current frequency of 60 Hz), a significant centrifugal force is exerted on each of the blades. In particular, as the gas turbine becomes larger, the dead weight of its rotor (e.g., compressor rotor disk) increases, resulting in a proportional increase in centrifugal force as well. Hence, the stress generated on the circumferential surface of the compressor rotor disk is a considerable problem.

The stress generated on the compressor rotor disk is a major cause of fatigue failure and associated damage. Meanwhile, in addition to the deterioration in product reliability of the gas turbine due to the damage, there are serious economic losses incurred, beyond repair costs alone, when the damage results in gas turbine operation being stopped or interrupted for long periods of time.

SUMMARY OF THE INVENTION

An object of the present disclosure is to provide a compressor rotor disk capable of reducing tensile stress and maximum stress, which are generated in the compressor rotor disk by centrifugal force and acts on a dovetail slot formed in the periphery of the compressor rotor disk.

Other objects and advantages of the present disclosure can be understood by the following description, and become apparent with reference to the embodiments of the present disclosure. Also, it is obvious to those skilled in the art to which the present disclosure pertains that the objects and advantages of the present disclosure can be realized by the means as claimed and combinations thereof.

In accordance with one aspect of the present disclosure, a compressor rotor disk may include a circumferential surface; and a plurality of dovetail slots formed along the circumferential surface, each dovetail slot comprising a cutout portion formed by removing a portion of a radially outer convex surface of the dovetail slot.

The dovetail slot may be formed in an axial direction of the compressor rotor disk. The cutout portion may include a planar surface parallel to the axial direction, a bottom boundary, and a fillet connecting the boundary edge to a remaining portion of the convex surface. The cutout portion may be formed by cutting away a portion of the convex surface about an axial center of the dovetail slot, to have the same width in opposite directions from the axial center of the dovetail slot.

The cutout portion may have a predetermined depth determined by a cross-sectional inflection point at which a radially inner concave surface of the dovetail slot becomes the radially outer convex surface. The predetermined depth may be determined so that the cutout portion resides fully above the cross-sectional inflection point.

In accordance with another aspect of the present disclosure, a compressor rotor disk assembly may include a plurality of compressor blades, each compressor blade having an airfoil blade disposed on a platform and a dovetail member formed beneath the platform; and a compressor rotor disk including a circumferential surface and a plurality of dovetail slots formed along the circumferential surface for respectively receiving the plurality of compressor blades, each dovetail slot comprising a cutout portion formed by removing a portion of a radially outer convex surface of the dovetail slot.

In accordance with a further aspect of the present disclosure, a gas turbine compressor may include a plurality of the above compressor rotor disk assemblies; a center tie rod configured to align the plurality of compressor rotor disk assemblies in an axial direction; and a compressor housing configured to accommodate the plurality of compressor rotor disk assemblies and the center tie rod.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The above and other objects, features and other advantages of the present disclosure will be more clearly understood from the following detailed description taken in conjunction with the accompanying drawings, in which.

DESCRIPTION OF EMBODIMENTS

The present disclosure may be subjected to various modifications and have various embodiments. Specific embodiments are illustrated in the drawings and will be described in the detailed description of the present disclosure. However, this is not intended to limit the present disclosure to specific embodiments. It should be understood that the present disclosure includes all modifications, equivalents or replacements that fall within the spirit and technical range of the present disclosure, and the scope of the present disclosure is not limited to the following embodiments.

The terminology used in the present disclosure is for the purpose of describing particular embodiments only and is not intended to limit the disclosure. As used in the disclosure and the appended claims, the singular forms "a," "an" and "the" are intended to include the plural forms as well, unless context clearly indicates otherwise. It will be further understood that the terms "comprises/includes" and/or "comprising/including" when used in this specification, specify the presence of stated features, integers, steps, operations, elements, components, and/or groups thereof, but do not preclude the presence or addition of one or more other features, integers, steps, operations, elements, components, and/or groups thereof.

Exemplary embodiments of the present disclosure will be described below in more detail with reference to the accompanying drawings. Throughout the disclosure, like reference numerals refer to like parts throughout the various figures and embodiments of the present disclosure. In certain embodiments, detailed descriptions of functions and configurations well known in the art may be omitted to avoid obscuring appreciation of the disclosure by a person of ordinary skill in the art. For the same reason, some components may be exaggerated, omitted, or schematically illustrated in the accompanying drawings.

Figure 1:
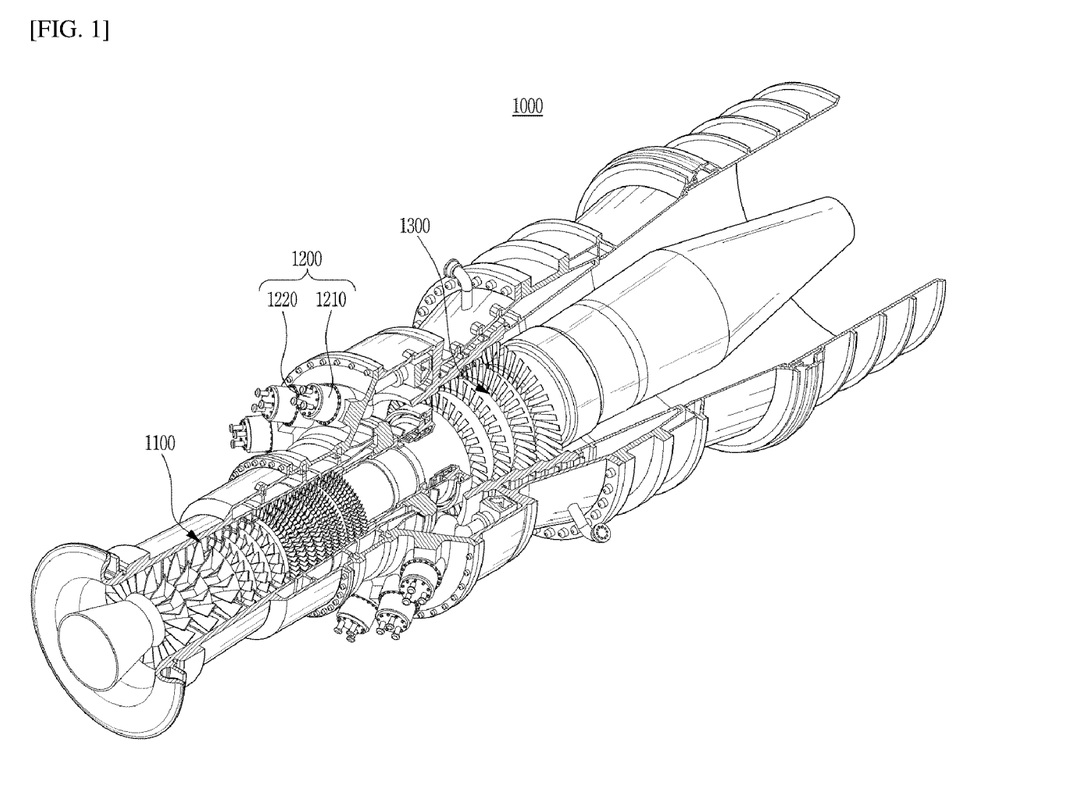
FIG. 1 is a cutaway perspective view of an example of a gas turbine including an axial compressor.
Figure 2:
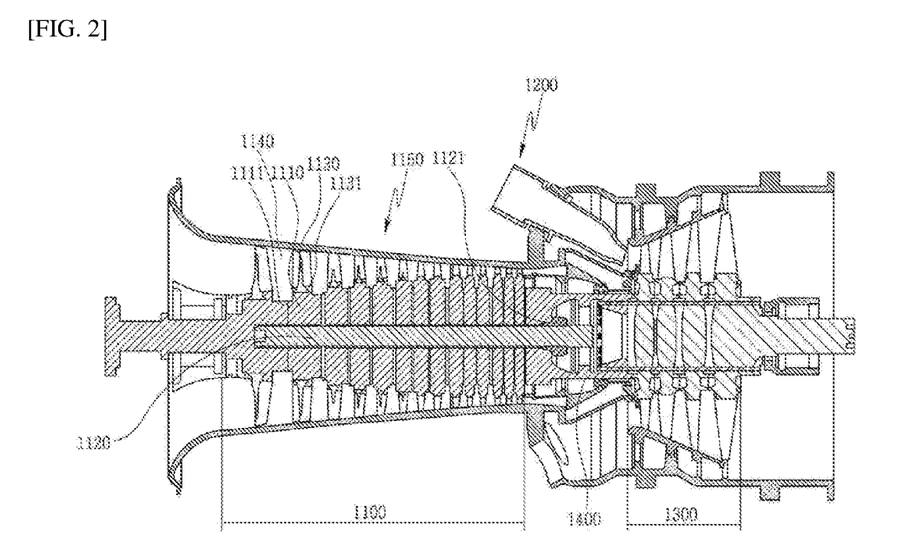
FIG. 2 is a cross-sectional view of the gas turbine of FIG. 1.

FIGS. 1 and 2 illustrate an example of a gas turbine including an axial compressor having a compressor rotor disk according to an embodiment of the present disclosure. First, the compressor of the gas turbine will be described in brief with reference to FIGS. 1 and 2.

As illustrated in FIGS. 1 and 2, a gas turbine 1000 includes a compressor 1100, a combustor 1200, and a turbine 1300. The compressor 1100 sucks and compresses outside air, the combustor 1200 mixes air compressed in the compressor 1100 with fuel for combustion, and the turbine 1300 is rotated by combustion gas discharged from the combustor 1200.

The compressor 1100 includes a compressor rotor disk 1110, a center tie rod 1120, a compressor blade 1130, a stator 1140, and a compressor housing 1150.

The compressor rotor disk 1110 fixes the compressor blade 1130 and rotates along with the rotation of the center tie rod 1120 to rotate the compressor blade 1130. In the axial compressor 1100 illustrated in the drawings, a plurality of compressor rotor disks 1110 are continuously arranged to sequentially increase a compression ratio of air.

The plurality of compressor rotor disks 1110 are fastened by the single center tie rod 1120 so as not to be axially spaced apart from each other. The individual compressor rotor disks 1110 are axially aligned by the center tie rod 1120 passing therethrough. Each of the compressor rotor disks 1110 has a plurality of protrusions or flanges (not shown) formed on the outer surface thereof to be coupled to an adjacent compressor rotor disk 1110 for rotation together therewith without slipping.

A compressed air supply passage may be formed in at least one of the compressor rotor disks 1110. The air compressed by the compressor blade 1130 may flow through the compressed air supply passage to the turbine 1300 to cool turbine blades.

The center tie rod 1120 passes through the compressor rotor disks 1110 to align them. The center tie rod 1120 receives torque generated in the turbine 1300 to rotate the compressor rotor disks 1110. To this end, a torque tube 1400 may be arranged between the compressor 1100 and the turbine 1300 and may be a torque transmission member that transmits the rotational torque generated in the turbine 1300 to the compressor 1100.

One end of the center tie rod 1120 is fastened to a compressor rotor disk positioned at the most upstream side, and the other end is inserted into the torque tube 1400 and fastened to a pressure nut 1121 in the torque tube 1400. The pressure nut 1121 pressurizes the torque tube 1400 toward the compressor rotor disks 1110 so that the individual compressor rotor disks 1110 are tightly pressed against each other.

The compressor blade 1130 is radially coupled to the outer peripheral surface of each of the compressor rotor disks 1110. The compressor blade 1130 may consist of a plurality of compressor blades formed in a multistage manner. A dovetail joint is formed between each of the compressor blades 1130 and the compressor rotor disk 1110 for their mutual fastening.

The present disclosure is not limited to the embodiment of coupling the compressor blade 1130 to the compressor rotor disk 1110 in a dovetail manner, and different coupling methods may be employed. In any event, the compressor blade 1130 rotates along with the rotation of the compressor rotor disk 1110 to compress the introduced air while moving the compressed air to a next-stage stator 1140.

The stator 1140 guides a flow of compressed air from a front-stage compressor blade 1130 to a rear-stage compressor blade 1130.

The compressor housing 1150 defines an external appearance of the compressor 1100 and accommodates the compressor rotor disk 1110, the center tie rod 1120, the compressor blade 1130, the stator 1140, etc. The compressor housing 1150 may contain a connection pipe (not shown) to move air compressed in several stages by the multistage compressor blade 1130 to the turbine 1300 for cooling the turbine blades.

A diffuser is located at the outlet of the compressor 1100 to diffuse and move compressed air. The diffuser rectifies compressed air before the compressed air is supplied to the combustor, and converts some of kinetic energy of the compressed air into a static pressure.

Figure 3:
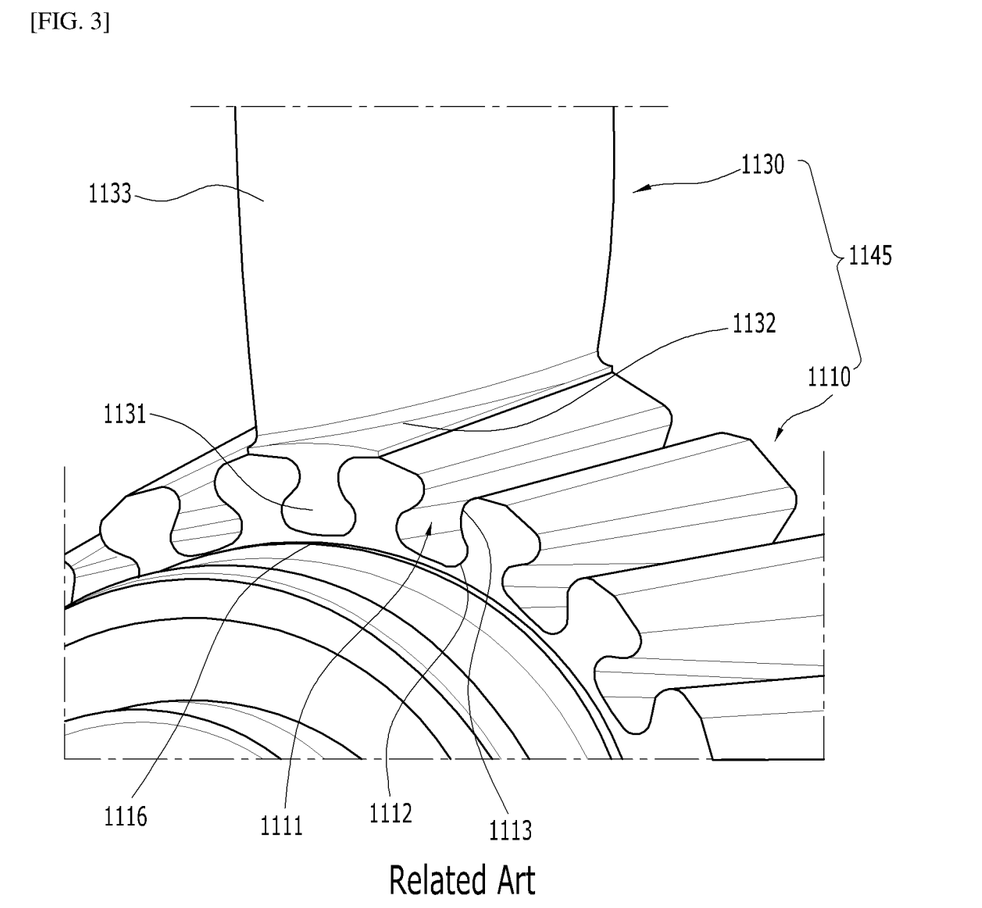
FIG. 3 is a perspective view of a structure of a conventional compressor rotor disk.

FIG. 3 illustrates a conventional structure in which the above-mentioned compressor blade 1130 and compressor rotor disk 1110 are coupled to each other in a dovetail manner.

As illustrated in the drawing, in a typical dovetail joint method, a plurality of dovetail slots 1111 are formed along the circumferential surface, namely a rim 1116, of the compressor rotor disk 1110. These dovetail slots 1111 are typically formed at equal angles, considering the balance weight of a rotor.

A dovetail member 1131 is formed beneath a platform 1132 of the compressor blade 1130 and has a shape corresponding to each of the dovetail slots 1111 of the compressor rotor disk 1110. An airfoil blade 1133 extends radially from the platform 1132 and has an aerodynamic structure for compression of air.

The dovetail slot 1111 is essentially an integration of a concave surface 1112 formed on each of the slot's radially inner sides and a convex surface 1113 formed on the slot's radially outer sides. Thus, the dovetail slot 1111 has a stepped structure that protrudes inward. The step occurs at the substantially midway point of the radially disposed sides of the dovetail slot 1111. When the dovetail member 1131 of the compressor blade 1130 having a shape corresponding to the dovetail slot 1111 is slid into and coupled to the dovetail slot 1111, they engage with each other by the stepped structure so that a reaction against the centrifugal force of the compressor rotor disk acts on the dovetail member. Therefore, the compressor blade 1130 remains fixed to the compressor rotor disk 1110.

The dovetail joint method as described above has been widely used to couple the compressor blade 1130 to the compressor rotor disk 1110, but problems need to be addressed as the gas turbine 1000 becomes larger. Ensuring the reliability of the dovetail joint is critical in order to ensure that the gas turbine 1000 has a damage-free service life.

A compressor rotor disk assembly 1145 includes a compressor rotor disk 1110 and compressor blade 1130, and as the gas turbine 1000 becomes larger, the compressor rotor disk assembly 1145 increases in size and weight. Further, regardless of size of the gas turbine 1000, there is no significant difference in the operating speed thereof. Namely, a concept of the present invention may be applied to variety types of gas turbine. In a gas turbine for power generation, a rotor is maintained at a constant speed of 3,600 RPM at an alternating current frequency of 60 Hz.

If the weight of the rotor is increased when the rotor rotates at the same speed, the centrifugal force increases with the weight, and thus the stress generated on the dovetail joint proportionally increases as well. In terms of the dovetail slot 1111 of the compressor rotor disk 1110, tensile stress is generally increased by the centrifugal force of the compressor rotor disk and maximum stress is also increased. In the dovetail member 1131 of the compressor blade 1130, which is tightly fitted into the dovetail slot 1111, compressive stress as a reaction against the centrifugal force of the dovetail slot 1111 acts on the dovetail member 1131, in which case the compressive stress and maximum stress are also increased.

These stress and maximum stress always act on the dovetail joint while the gas turbine 1000 is operated, that is, as the compressor rotor disk assembly 1145 is rotated. Hence, these stresses are a major cause of fatigue failure and associated damage to the gas turbine 1000, the deterioration in product reliability of the gas turbine 1000 due to the damage, and economic losses when the damage results in gas turbine operation being stopped or interrupted for long periods of time.

Accordingly, the present disclosure has been made in view of the above problems, and is more particularly aimed to reduce both tensile stress and maximum stress by lightening the compressor rotor disk 1110, the weigh percentage of which is high in the compressor rotor disk assembly 1145. A detailed configuration of the present disclosure for this purpose will be described with reference to FIGS. 4 to 6.

Figure 4:
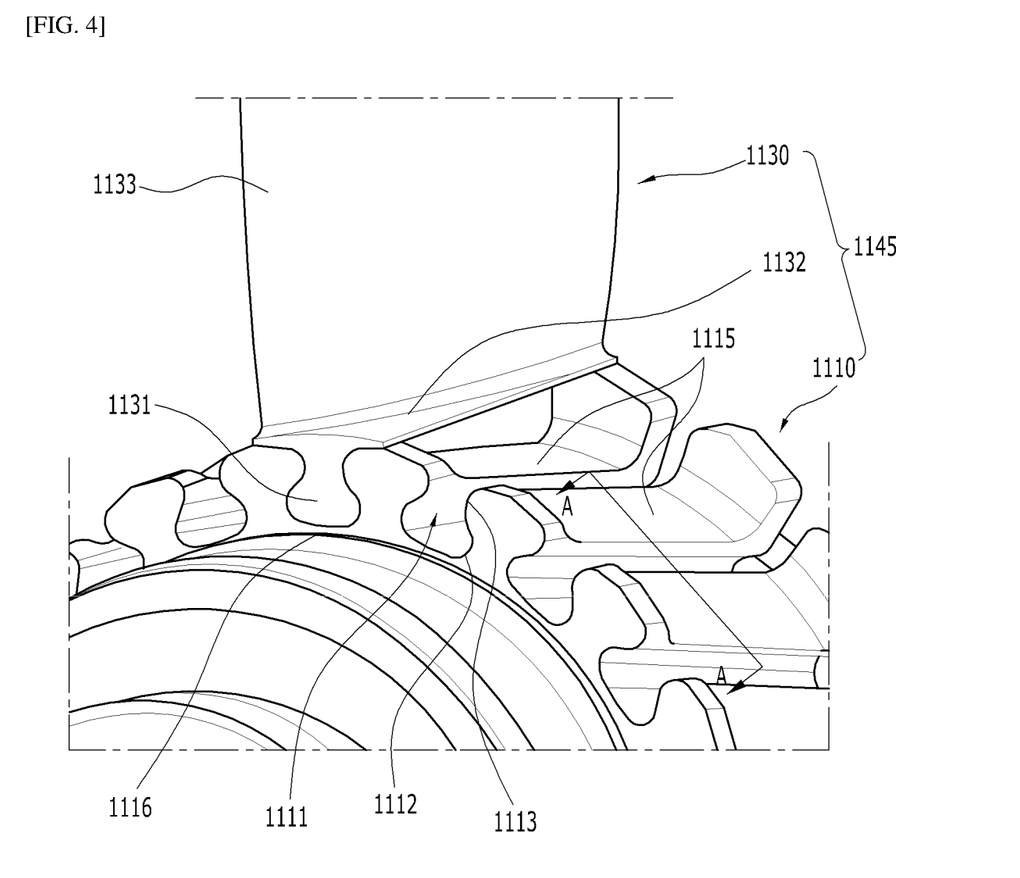
FIG. 4 is a perspective view of a structure of a compressor rotor disk according to an embodiment of the present disclosure.

FIG. 4 illustrates an overall configuration of the compressor rotor disk assembly 1145 according to the embodiment of the present disclosure, for comparison with that in the related art of FIG. 3. The compressor rotor disk assembly 1145 of the present disclosure exhibits an improved structure of the dovetail slot 1111 of the compressor rotor disk 1110, without changing the structure of the compressor blade 1130. Therefore, the present disclosure will be mainly described with respect to the improved structure of the compressor rotor disk 1110.

Figure 5:
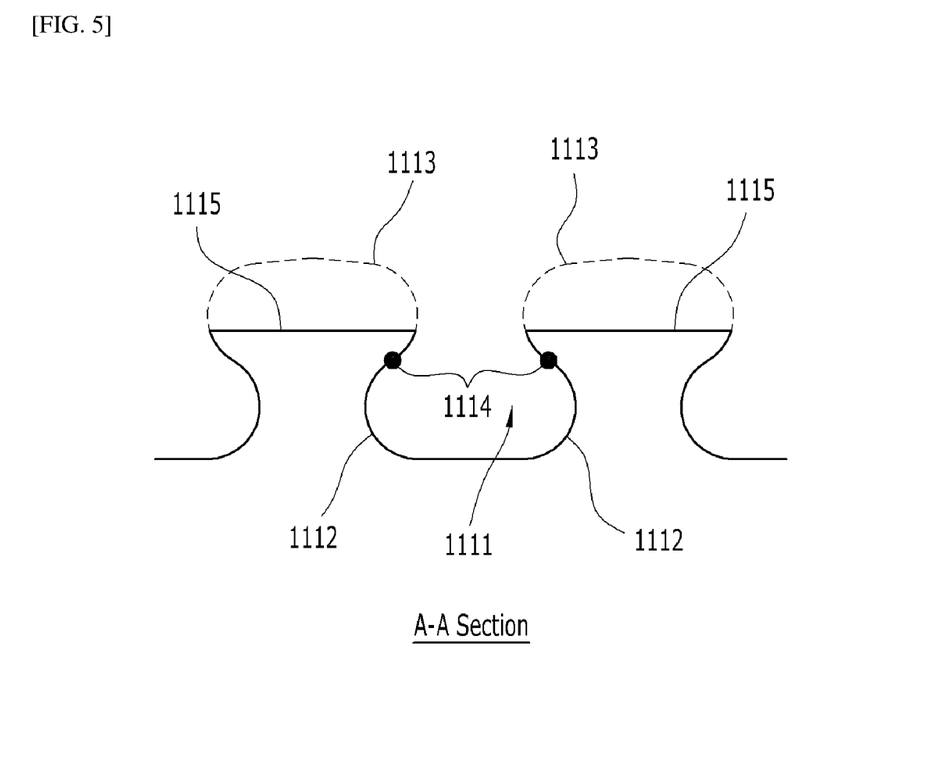
FIG. 5 is a cross-sectional view taken along line A-A of FIG. 4.
Figure 6:
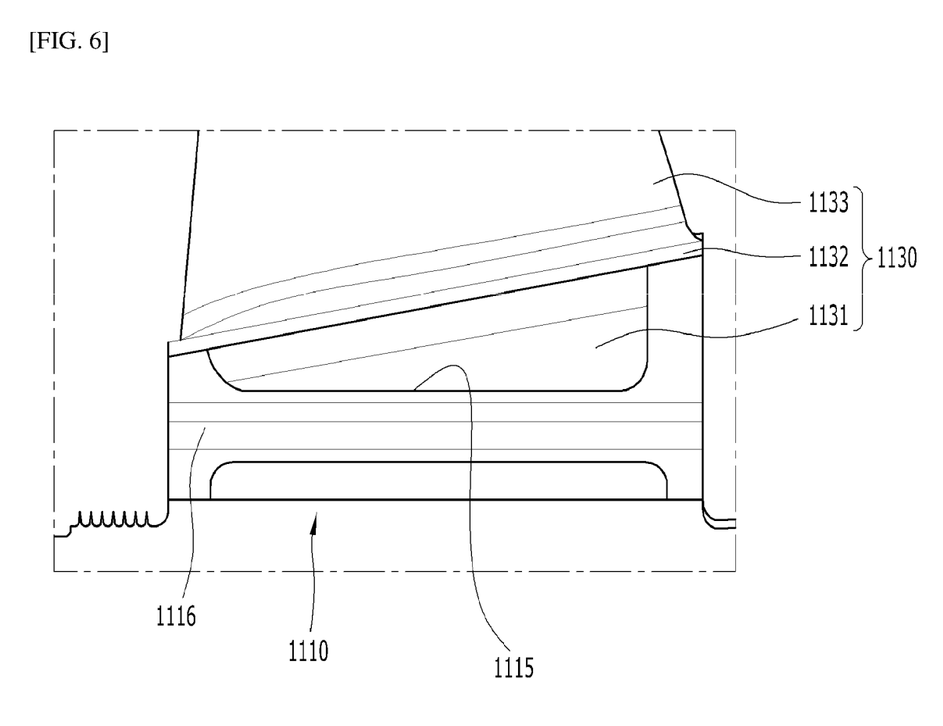
FIG. 6 is a side view of a compressor blade mounted to the circumferential surface of the compressor rotor disk of FIG. 4.

As illustrated in FIGS. 4 to 6, the compressor rotor disk 1110 according to the embodiment of the present disclosure includes a plurality of dovetail slots 1111 formed along a rim 1116, which is effectively the circumferential surface of the compressor rotor disk 1110. Each of the dovetail slots 1111 includes a cutout portion 1115 formed by removing a portion of the radially outer convex surface 1113.

In the illustrated embodiment, the dovetail slot 1111 is formed in the axial direction of the compressor rotor disk 1110 (axial type), in which case the cutout portion 1115 is parallel to the axial direction. Although not illustrated, if the cutout portion 1115 of the present disclosure is applied to a structure (tangential type) in which the dovetail slots 1111 are continuously formed around the circumferential surface of the compressor rotor disk, cutout portions will be formed around a circumferential dovetail slot with the circumferential dovetail slot interposed therebetween.

As such, in the present disclosure, the cutout portion 1115 is formed by removing a portion of the radially outer convex surface 1113 of each of the dovetail slots 1111 formed on the circumferential surface of the compressor rotor disk 1110. Accordingly, since the volume occupied by the cutout portion 1115 is removed from the dovetail slot, as compared to the related art, the dead weight of the compressor rotor disk is reduced by a corresponding amount and the centrifugal force of the compressor rotor disk is decreased by the reduction in weight. In particular, since the magnitude of centrifugal force is proportional to a radius as well as a mass when a rotational speed (angular velocity) is constant ($F_c = mr\omega^2$), forming the cutout portion 1115 at the radially outer portion of the compressor rotor disk 1110 maximizes a reduction in centrifugal force.

In accordance with the compressor rotor disk 1110 of the present disclosure, it is possible to reduce both of stress and maximum stress acting on the dovetail joint by reducing the centrifugal force of the compressor rotor disk 1110 through the formation of the cutout portion 1115. Thus, the durability and reliability of the compressor rotor disk assembly 1145 are enhanced. In addition, processing costs are reduced since the number of processes required to precisely mill the dovetail slot 1111 is reduced by the formation of the cutout portion 1115.

The shape of the cutout portion 1115 itself is not crucial as long as the cutout portion 1115 is formed by removing a portion of the convex surface 1113 of the dovetail slot 1111. However, the cutout portion 1115 may preferably include a planar surface parallel to the axial direction, considering the convenience and cost of processing, the balance weight, etc. (in the axial type). As illustrated in the drawings, it is further preferable to connect a remaining portion of the convex surface 1113 to a bottom boundary of the cutout portion 1115 using a rounded surface (e.g., fillet processing). That is, the cutout portion 1115 includes the bottom boundary and a fillet for connecting the bottom boundary to a remaining portion of the convex surface 1113. This is because it is effective to relieve concentration of stress on a sharp edge.

Here, forming the cutout portion 1115 by removing "a portion" of the convex surface 1113 of the dovetail slot 1111 means that a portion of the dovetail slot 1111 remains as the shape of the conventional dovetail formed of the convex surface 1113 and the concave surface 1112. The remaining portion of the convex surface 1113 is to secure a minimum contact area of the platform 1132 sufficient to smoothly fit the dovetail member 1131 of the compressor blade 1130 to the dovetail slot, without rocking, and to maintain an alignment state after the coupling is completed. Of course, the remaining portion of the convex surface 1113 contributes to support of the compressor blade 1130.

The cutout portion 1115 may be formed by cutting away a portion of the convex surface 1113 from the axial center of the dovetail slot 1111, that is, in opposite directions (upstream and downstream of the compressor) from the axial center. Thus, the cutout portion 1115 is formed such that a portion of the convex surface 1113 remains at either end of the dovetail slot, that is, both the inlet of the dovetail slot 1111 and the end opposite to the inlet remain. As a portion of the convex surface 1113 remains in the inlet, it is possible to prevent rocking in the initial stage of fitting the dovetail member 1131 of the compressor blade 1130 into the dovetail slot, and to balance the compressor blade 1130 and maintain the alignment state by the contact between the platform 1132 of the compressor blade 1130 and the convex surface 1113 at both ends. In the illustrated embodiment, the cutout portion 1115 is formed to have the same width in the opposite directions from the axial center of the dovetail slot 1111, in consideration maintaining the balance weight of the compressor rotor disk.

The formation of the cutout portion 1115 to have a certain volume is a design consideration based on the premise that the compressor blade 1130 is to be strongly fixed. The size of the cutout portion 1115 should be determined considering the size, material strength, rated operating speed, and compression ratio of the compressor rotor disk assembly 1145, the adiabatic temperature rise of air, and the like.

On the other hand, the formation of the cutout portion 1115 to have a certain depth, as a specific limit, may be determined. Referring to FIG. 5, which is a cross-sectional view taken along line "A-A" of FIG. 4, the dovetail slot 1111 has a cross-sectional shape that is continuously changed from the radially inner concave surface 1112 to the radially outer convex surface 1113. An inflection point 1114 may be viewed as a boundary point at which the concave surface 1112 becomes the convex surface 1113. On the basis of the cross-sectional inflection point 1114, the radially inner concave surface 1112 is a surface region pressing against the convex surface 1113 of the dovetail member 1131 to generate a bearing capability. Therefore, forming the cutout portion 1115 only to a predetermined depth with respect to (above) the more radially inward boundary inflection point 1114 so as not to invade the concave surface 1112 may be set as a design requirement. Here, the predetermined depth is determined so that the cutout portion 1115 resides fully above the cross-sectional inflection point 1114.

As is apparent from the above description, in accordance with the compressor rotor disk, compressor rotor disk assembly, and gas turbine compressor of the present disclosure having the above configuration, the cutout portion is formed by removing a portion of the radially outer convex surface of each of the dovetail slots formed on the outer circumferential surface of the compressor rotor disk. Accordingly, since the volume occupied by the cutout portion is removed from the dovetail slot compared to the related art, the dead weight of the compressor rotor disk can be reduced by a corresponding amount and the centrifugal force of the compressor rotor disk can be decreased by the reduction in weight. Thus, it is possible to reduce stress and maximum stress.

In particular, since, assuming a constant rotational speed, the magnitude of centrifugal force is proportional to a radius as well as a mass, it is possible to maximize a reduction in centrifugal force by forming the cutout portion at the radially outer portion of the compressor rotor disk of the present disclosure.

It is possible to reduce both of stress and maximum stress acting on the dovetail joint by reducing the centrifugal force of the compressor rotor disk through the formation of the cutout portion of the present disclosure, thereby enhancing the durability and reliability of the compressor rotor disk. In addition, processing costs are reduced since the number of processes required to precisely mill the dovetail slot is reduced by the formation of the cutout portion.

Although the present disclosure has been described with respect to the specific embodiments, it will be apparent to those skilled in the art that various variations and modifications may be made by adding, changing, or removing components without departing from the spirit and scope of the disclosure as defined in the following claims. The present disclosure may be used, for example, when turbine blades instead of those in the compressor are coupled in a dovetail joint manner, and these variations and modifications fall within the spirit and scope of the disclosure as defined in the appended claims.

What is claimed is:

1. A compressor rotor disk comprising:
   a circumferential surface in which a plurality of dovetail slots are formed, each of the plurality of dovetail slots having a concave surface and a convex surface integrally formed with the concave surface and disposed outwardly from the concave surface in a radial direction of the compressor rotor disk, the plurality of dovetail slots including an adjacent pair of dovetail slots between which a dovetail slot structure is formed by the concave and convex surfaces,
   wherein the dovetail slot structure extends in an axial direction of the compressor rotor disk, from an inlet of each of the adjacent pair of dovetail slots to an end opposite to the inlet, through an axial center between the inlet and the end opposite to the inlet, and
   wherein the dovetail slot structure comprises
      a cutout portion formed by continuously removing a portion of the dovetail slot structure formed by the convex surface, the cutout portion extending continuously in a circumferential direction of the compressor rotor disk between the convex surfaces disposed on opposing sides of the adjacent pair of dovetail slots, the removed portion being one portion in the axial direction and including portions of the dovetail slot structure residing on either side of the axial center of the dovetail slot structure; and
      a remaining portion of the convex surface that includes an inlet portion of the convex surface disposed at the inlet and an opposite end portion of the convex surface disposed at the end opposite to the inlet, the inlet portion of the remaining portion and the opposite end portion of the remaining portion being separated from each other in the axial direction by the cutout portion occupying a space between the inlet and opposite end portions of the remaining portion, the inlet portion of the remaining portion and the opposite end portion of the remaining portion having the same width to maintain a balance weight of the compressor rotor disk.

2. The compressor rotor disk according to claim 1, wherein the remaining portion is configured to secure a contact area for receiving radially inwardly facing surfaces of axially opposite ends of a platform of a compressor blade and to engage with axially opposite ends of a dovetail member of the compressor blade.

3. The compressor rotor disk according to claim 1, wherein the cutout portion comprises a planar surface that extends parallel to the axial direction, the planar surface including opposite ends respectively communicating with the remaining portion and opposite sides respectively communicating with the convex surface.

4. The compressor rotor disk according to claim 1, wherein the cutout portion comprises a bottom boundary and a fillet connecting the bottom boundary to the remaining portion of the convex surface.

5. The compressor rotor disk according to claim 1, wherein the cutout portion is formed by cutting away axially equal portions of the convex surface about the axial center of the dovetail slot structure.

6. The compressor rotor disk according to claim 1, wherein the cutout portion is formed by removing an axially equal portion extending in each of opposite directions from the axial center of the dovetail slot structure.

7. The compressor rotor disk according to claim 1, wherein the cutout portion has a predetermined depth determined by a cross-sectional inflection point occurring between the concave and convex surfaces.

8. The compressor rotor disk according to claim 7, wherein the predetermined depth is determined so that the cutout portion resides fully above the cross-sectional inflection point.

9. A compressor rotor disk assembly comprising:
a plurality of compressor blades, each compressor blade having an airfoil blade disposed on a platform and a dovetail member formed beneath the platform; and
a compressor rotor disk comprising a circumferential surface in which a plurality of dovetail slots are formed to respectively receive the plurality of compressor blades, each of the plurality of dovetail slots having a concave surface and a convex surface integrally formed with the concave surface and disposed outwardly from the concave surface in a radial direction of the compressor rotor disk, the plurality of dovetail slots including an adjacent pair of dovetail slots between which a dovetail slot structure is formed by the concave and convex surfaces,
wherein the dovetail slot structure extends in an axial direction of the compressor rotor disk, from an inlet of each of the adjacent pair of dovetail slots to an end opposite to the inlet, through an axial center between the inlet and the end opposite to the inlet, and
wherein the dovetail slot structure comprises
a cutout portion formed by continuously removing a portion of the dovetail slot structure formed by the convex surface, the cutout portion extending continuously in a circumferential direction of the compressor rotor disk between the convex surfaces disposed on opposing sides of the adjacent pair of dovetail slots, the removed portion being one portion in the axial direction and including portions of the dovetail slot structure residing on either side of the axial center of the dovetail slot structure; and
a remaining portion of the convex surface that includes an inlet portion of the convex surface disposed at the inlet and an opposite end portion of the convex surface disposed at the end opposite to the inlet, the inlet portion of the remaining portion and the opposite end portion of the remaining portion being separated from each other in the axial direction by the cutout portion occupying a space between the inlet and opposite end portions of the remaining portion, the inlet portion of the remaining portion and the opposite end of the remaining portion having the same width to maintain a balance weight of the compressor or rotor disk.

10. A gas turbine compressor comprising:
a plurality of compressor rotor disk assemblies;
a center tie rod configured to align the plurality of compressor rotor disk assemblies in an axial direction; and
a compressor housing configured to accommodate the plurality of compressor rotor disk assemblies and the center tie rod,
wherein each of the plurality of compressor rotor disk assemblies comprises:
a plurality of compressor blades, each compressor blade having an airfoil blade disposed on a platform and a dovetail member formed beneath the platform; and
a compressor rotor disk comprising a circumferential surface in which a plurality of dovetail slots are formed to respectively receive the plurality of compressor blades, each of the plurality of dovetail slots having a concave surface and a convex surface integrally formed with the concave surface and disposed outwardly from the concave surface in a radial direction of the compressor rotor disk, the plurality of dovetail slots including an adjacent pair of dovetail slots between which a dovetail slot structure is formed by the concave and convex surfaces,
wherein the dovetail slot structure extends in the axial direction, from an inlet of each of the adjacent pair of dovetail slots to an end opposite to the inlet, through an axial center between the inlet and the end opposite to the inlet, and
wherein the dovetail slot structure comprises
a cutout portion formed by continuously removing a portion of the dovetail slot structure formed by the convex surface, the cutout portion extending continuously in a circumferential direction of the compressor rotor disk between the convex surfaces disposed on opposing sides of the adjacent pair of dovetail slots, the removed portion being one portion in the axial direction and including portions of the dovetail slot structure residing on either side of the axial center of the dovetail slot structure; and
a remaining portion of the convex surface that includes an inlet portion of the convex surface disposed at the inlet and an opposite end portion of the convex surface disposed at the end opposite to the inlet, the inlet portion of the remaining portion and the opposite end portion of the remaining portion being separated from each other in the axial direction by the cutout portion occupying a space between the inlet and opposite end portions of the remaining portion, the inlet portion of the remaining portion and the opposite end portion of the remaining portion having the same width to maintain a balance weight of the compressor rotor disk.

* * * * *